United States Patent [19]

Krivec

[11] Patent Number: 5,611,714
[45] Date of Patent: Mar. 18, 1997

[54] WIRE FLEX PIVOT

[75] Inventor: Bert Krivec, Waukesha, Wis.

[73] Assignee: Snap-on Technologies, Inc., Crystal Lake, Ill.

[21] Appl. No.: 483,713

[22] Filed: Jun. 7, 1995

[51] Int. Cl.⁶ ................................................. H01R 4/48
[52] U.S. Cl. ................................................. 439/759
[58] Field of Search ........................... 439/822, 759, 439/506, 829

[56] References Cited

U.S. PATENT DOCUMENTS

| | | |
|---|---|---|
| 1,753,985 | 4/1930 | Flintermann . |
| 1,930,772 | 10/1933 | Richer et al. ............. 439/759 OR |
| 1,954,934 | 4/1934 | Houdaille et al. . |
| 2,912,287 | 11/1959 | Leyenberger . |
| 3,360,255 | 12/1967 | Ormond . |
| 3,446,465 | 5/1969 | Niskanen . |
| 3,458,933 | 8/1969 | Rogers . |
| 3,575,070 | 4/1971 | Nichols . |
| 3,807,029 | 4/1974 | Troeger . |
| 3,825,992 | 7/1974 | Troeger . |
| 4,316,315 | 2/1982 | Vogelnik . |
| 4,405,184 | 9/1983 | Bahiman . |
| 4,609,302 | 9/1986 | Kittell . |
| 4,655,629 | 4/1987 | Flaherty . |
| 4,717,288 | 1/1988 | Finn et al. . |
| 4,812,072 | 3/1989 | Brooks . |
| 4,934,957 | 6/1990 | Bellusci ........................ 439/829 X |
| 4,975,089 | 12/1990 | Lee ................................ 439/506 X |
| 5,021,008 | 6/1991 | Scherer ......................... 439/822 X |
| 5,061,107 | 10/1991 | Brooks . |
| 5,245,894 | 9/1993 | Undin . |

*Primary Examiner*—P. Austin Bradley
*Assistant Examiner*—Daniel Wittels
*Attorney, Agent, or Firm*—Emrich & Dithmar

[57] ABSTRACT

A flexural pivot joint is used to join two members for pivotal movement about a pivot axis. The pivot joint comprises two pairs of resilient spring wire sections spaced apart along the pivot axis. Each wire section is coupled to both of the members and has a longitudinal axis. The wire sections of each pair are disposed in cross-arrangement with respect to each other and are deflectable from their respective longitudinal axes to accommodate pivoting of the members from an at-rest condition about the pivot axis. In an alternative embodiment the flexural pivot joint includes first and second brackets respectively coupled to the members. The brackets are disposed facing each other and include a plurality of slots.

30 Claims, 2 Drawing Sheets

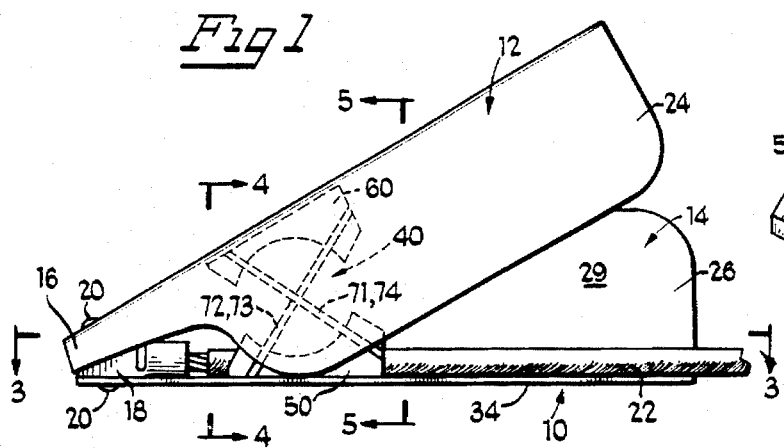
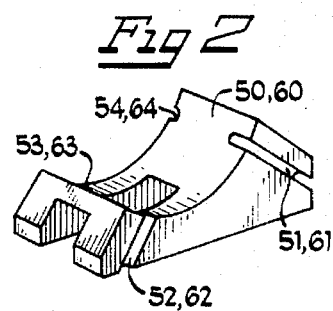
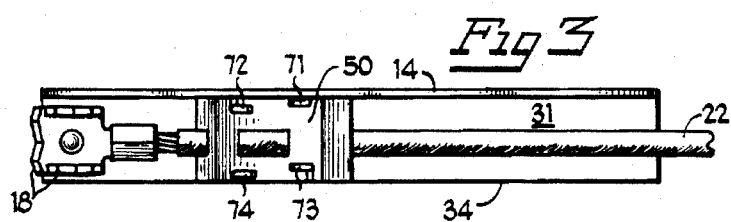
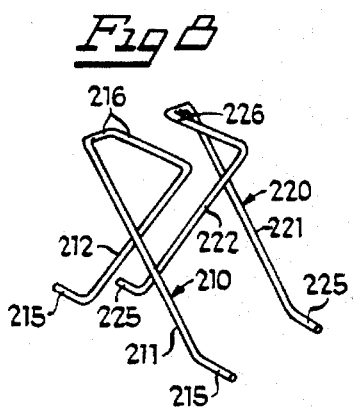
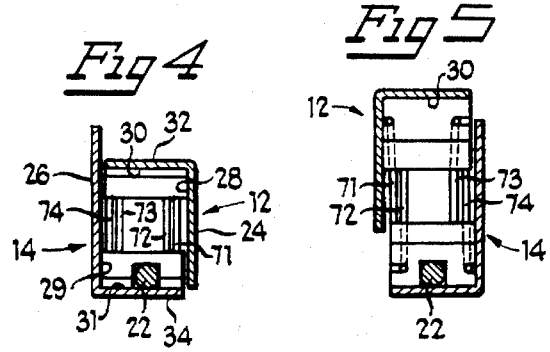
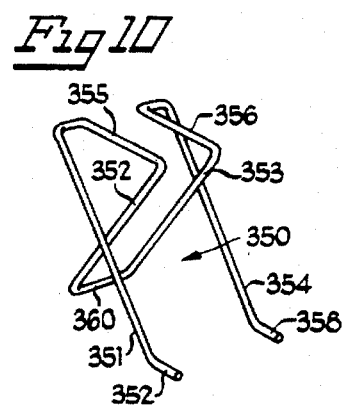
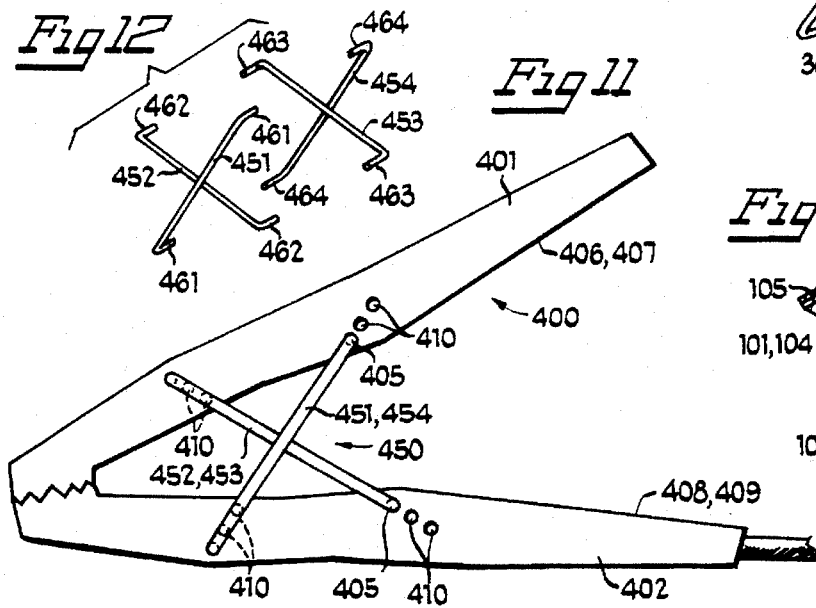
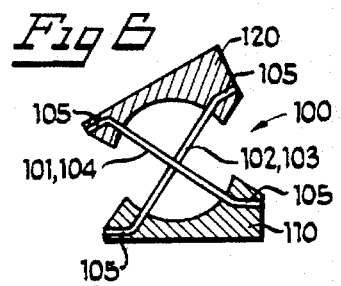

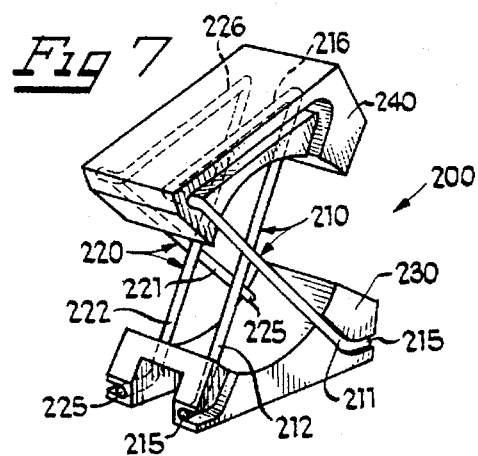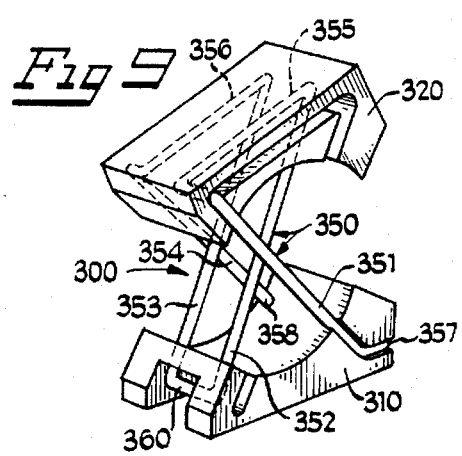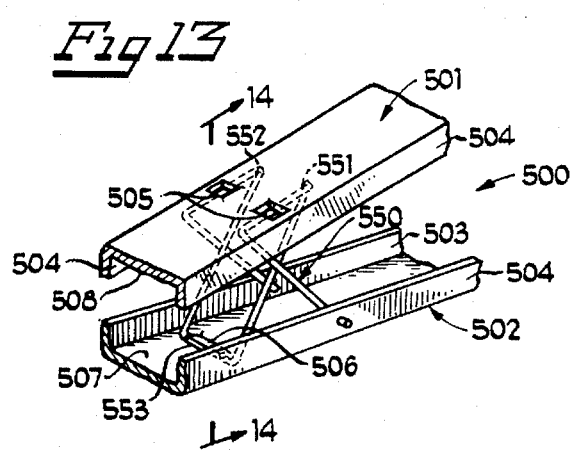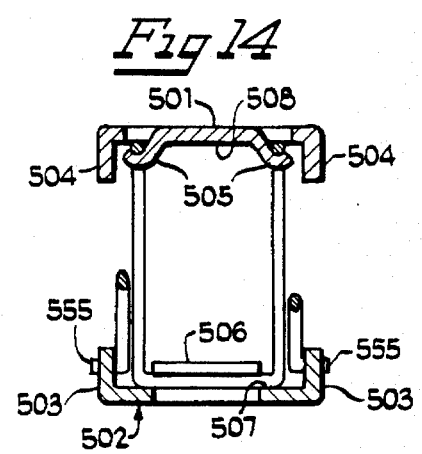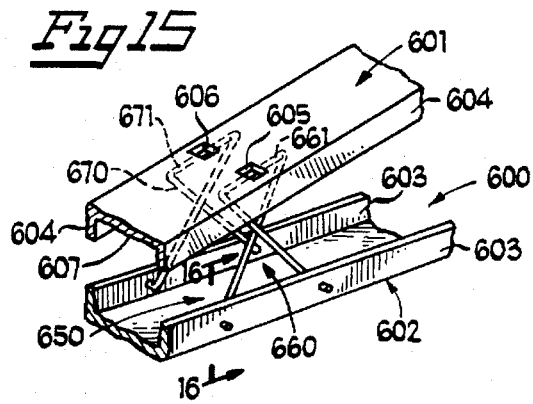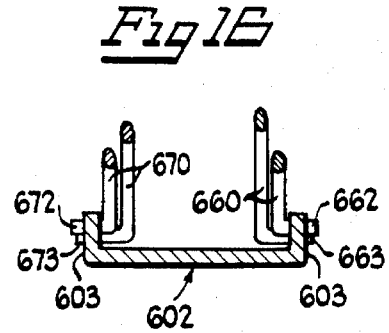

5,611,714

WIRE FLEX PIVOT

BACKGROUND OF THE INVENTION

1. Field of the Invention

The present invention relates to battery or booster cable clamps and, more particularly to joints to pivotally interconnect the levers of such a clamp.

2. Description of the Prior Art

Conventional battery or booster cable clamps typically have two levers, a jaw portion on each lever for clamping onto a battery electrode and a pivot joint which may comprise a torsional spring disposed about a rivet or the like which pivotally connects the two levers of the booster clamp. The spring is adapted to bias the jaw portions of the clamp together to maintain the clamp in a closed position. Though this type of joint is widely used, it has several parts which add to the cost and the labor needed to manufacture the clamp.

SUMMARY OF THE INVENTION

It is a general object of the invention to provide an improved booster cable clamp which avoids the disadvantages of prior clamps while affording additional structural and operational advantages.

An important feature of the invention is the provision of a booster cable clamp which is of a relatively simple and economical construction.

These and other features of the present invention are attained by providing a flexural pivot joint joining two members for pivotal movement about a pivot axis. The pivot joint comprises two pairs of resilient spring wire sections spaced apart along the pivot axis. Each wire section is coupled to both of the members and has a longitudinal axis. The wire sections of each pair are disposed in cross-arrangement with respect to each other and are deflectable from their respective longitudinal axes to accommodate pivoting of the members from an at-rest condition about the pivot axis.

In another embodiment of the present invention there is provided a flexural pivot joint for pivotally joining two members, the joint having first and second brackets respectively coupled to the members. The brackets are disposed facing each other and include a plurality of slots. At least one pair of resilient spring wire sections are also included in the joint, with each wire section being coupled to both brackets and having a longitudinal axis. The wire sections are crossed and deflectable from their respective longitudinal axes to facilitate pivoting of the members from an at-rest condition about a pivot axis.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevation view of a battery jumper cable clamp including a flexural pivot constructed in accordance with and embodying the features of the present invention and having brackets slotted for engagement with two pairs of flexible crossed wires;

FIG. 2 is an enlarged, perspective view of the bottom bracket of the clamp of FIG. 1;

FIG. 3 is a horizontal sectional view taken generally along the line 3—3 in FIG. 1;

FIG. 4 is a vertical sectional view taken generally along the line 4—4 in FIG. 1;

FIG. 5 is a vertical sectional view taken generally along the line 5—5 in FIG. 1;

FIG. 6 is a side elevation view of a flexural pivot similar to that in FIG. 1, but showing the brackets having bent slots to accommodate wire sections with bent ends;

FIG. 7 is an enlarged perspective view of a flexural wire pivot joint having brackets similar to those in FIG. 6 but slotted for engagement with two discrete wires each having crossed wire sections;

FIG. 8 is a reduced perspective view of the two discrete wires in FIG. 7;

FIG. 9 is a perspective view similar to FIG. 7 of a flexural wire pivot joint having brackets similar to those in FIGS. 6 and 7 but slotted for engagement with one unitary wire having multiple wire sections;

FIG. 10 is a reduced perspective view of the unitary wire of the joint of FIG. 9;

FIG. 11 is a side elevation view of a clamp having a flexural wire pivot in accordance with another embodiment of the present invention and including two pairs of crossed discrete wires coupled directly to the clamp's gripping levers;

FIG. 12 is a reduced, perspective view of the two pairs of crossed wires of FIG. 11;

FIG. 13 is a fragmentary, perspective view in partial section of a clamp like that of FIG. 11, but having a pivot joint using the single unitary wire of FIG. 10 coupled directly to the clamp's gripping levers;

FIG. 14 is an enlarged, vertical sectional view taken generally along the line 14—14 in FIG. 13;

FIG. 15 is a view similar to FIG. 13, but with a joint using the two discrete wires of FIG. 8; and FIG. 16 is an enlarged, fragmentary sectional view taken generally along the line 16—16 in FIG. 15.

DETAILED DESCRIPTION OF THE PREFERRED EMBODIMENTS

Referring to FIGS. 1–5, there is illustrated a battery jumper cable or booster cable clamp 10 including an upper lever 12 and a lower lever 14 pivotally interconnected. The upper and lower levers 12, 14 have first and second jaw portions 16, 18, respectively, connected by rivets 20 thereto. The second jaw portion 18 is connected to one end of a cable 22, the other end of which can be connected to a second booster clamp or other electrical connection (not shown).

As seen best in FIGS. 4–5, the upper and lower levers 12, 14 are identical and respectively include generally planar first walls 24, 26 having planar inner surfaces 28, 29 and second walls 32, 34 substantially normal to and integral with the vertical walls 24, 26, and having planar inner surfaces 30, 31.

A flexural pivot joint 40 is disposed between vertical walls 24 and 26 as well as between walls 32, 34. The pivot joint 40 consists of first and second brackets 50, 60. The brackets 50, 60 are identical and respectively include slots 51–54 and 61–64 (see FIG. 2) selectively spaced for engagement with the respective ends of four, discrete, straight wires 71–74 having the same diameter. The wires 71–74 are arranged in two spaced-apart pairs 71, 72 and 73, 74, with the wires of each pair crossed, as seen in FIG. 1. The pairs 71, 72 and 73, 74 are respectively disposed on opposite sides of the brackets 50, 60 with the ends of the wires 71–74 fitted in the slots 51–54 and 61–64. The wires 71–74 are symmetrically deflectable from their respective longitudinal axes to accommodate pivoting of the levers 12, 14, about a pivot axis, from an at-rest condition of the clamp 10. The crossing points of the wire pairs 71, 72 and 73, 74 define a line parallel to the pivot axis.

The deflection strength of the pivot joint 40 is a function of the diameter and length of the wires 71–74. The levers 12, 14 are preferably metallic. The brackets 50, 60 are preferably made of aluminum or similar non-corrosive metal and welded or otherwise attached to the respective inner surfaces 28–31 of levers 12, 14. The wires 71–74 are of spring material, and may be made of music wire, silicon chromium wire, or a like non-corrosive spring material.

The opposite ends of wires 71–74 are preferably press-fit into their respective slots within each of the brackets 50, 60, and may optionally be swaged therein to provide a more secure engagement. Preferably, the parts are so dimensioned and arranged that, when assembled with the clamp in its closed-jaw condition shown in FIG. 1, the wires 71–74 will be in an unloaded condition and bias the jaw portions 16, 18 closed.

Referring to FIG. 6, there is shown a flexural pivot joint 100 having two pairs of discrete crossed wires 101, 102 and 103, 104 coupled, at ends 105 thereof, to a pair of identical, facing brackets 110, 120. The brackets 110, 120 include symmetrical slots dimensioned to accommodate the ends 105 of wires 101–104, which ends 105 are bent out of the longitudinal axes of the associated wires for the purpose of providing a fit to better retain the wires 101–104 in the slots. Otherwise, the joint 100 functions the same as joint 40.

Referring to FIGS. 7 and 8, there is shown an alternative construction of the flexural pivot joints 40 and 100, designated 200, and having two wires 210, 220 and symmetrical but non-identical first and second brackets 230, 240. The wire 210 includes crossed wire sections 211, 212 with each section having a bent free end 215. The other ends of the sections 211, 212 are joined by an associated, L-shaped intermediate wire portion 216. Similarly, the wire 220 includes crossed wire sections 221, 222, with each section having a bent free end 225. The other ends of the sections 221, 222 are joined by an associated, L-shaped intermediate wire portion 226. First bracket 230 is slotted in a manner similar to bracket 110 of joint 100 to accommodate the bent free ends 215, 225 of wires 210, 220, respectively. The second bracket 240 is slotted as shown in FIG. 7 to matingly receive the intermediate wire portions 216, 226 of each of wires 210, 220, with wires 210, 220 being press-fit or swaged therein in the same manner as wires 71–74 of joint 40 (and 101–104 of joint 100) so as to be deflectable about the clamp's pivot axis in response to a squeezing force on the levers 12, 14. The shape of discrete wires 210, 220, as separate and distinct elements from the brackets 230, 240, is shown generally in FIG. 8.

FIG. 9 shows another construction of a flexural pivot joint 300 having first and second brackets 310, 320 slotted to receive a unitary wire 350 having multiple wire sections, including four wire sections 351–354 arranged in crossed pairs 351, 352 and 353, 354 similar to wire sections 211, 212 and 221, 222 in pivot joint 200. The sections 351, 352 have adjacent ends thereof joined by an intermediate wire portion 355, 356 while the sections 353, 354 have adjacent ends thereof joined by an intermediate wire portion. The ends of the wire sections 351–354 opposite the ends joined by the intermediate wire portions 355,356 consist of two bent free ends 357,358 and two ends defining a central wire portion 360 integrally connecting the two pairs 351–352 and 353–354. The shape of unitary wire 350 is shown generally in FIG. 10.

Referring to FIGS. 11 and 12, there is illustrated a clamp 400 including flanged upper and lower levers 401, 402 pivotally interconnected by a flexural pivot joint 450 consisting of four discrete wires 451–454 arranged in crossed pairs, for deflection about a pivot axis of the clamp 400. Each wire 451–454 has two bent ends 461–464 respectively coupled in associated holes 405 on depending flanges 406–409 on the clamp levers 401, 402. When the levers 401, 402 are squeezed, the wires 451–454 will be symmetrically deflected in a manner similar to the deflection of the pivot joint 40 in FIG. 1. Preferably, the wire ends 461–464 are pressed-in or swaged into place onto the flanges 406–409. Alternatively, however, the wires 451–454 can be straight wires and molded into the levers 401–402 in the case where the levers are made from injection molded plastic. Extra holes 410 are included on the clamp flanges 406–409 to facilitate alternately attaching wires equivalent to wires 451–454, but of different length for the purpose of varying the pivot joint's deflection resistance.

FIGS. 13–14 illustrate a clamp 500 having a flexural pivot joint consisting of a unitary wire 550 similar to the wire 350 disclosed in FIG. 10, and having like L-shaped intermediate wire portions 551, 552 and a central wire portion 553. The clamp 500 includes upper and lower levers 501, 502 having associated flanges 503–504. Also, appropriate flange connections 505, 506 are provided on the respective inner surfaces 507, 508 of levers 501, 502, engageable with wire portions 551–553, for securely engaging the wire 550 within the clamp 500. The wire 550 has free ends 555 pointing outwardly for coupling to associated holes on the flanges 503–504.

FIGS. 15–16 show yet another clamp 600 having a flexural pivot joint 650 consisting of two-discrete wires 660, 670 similar to the wires 210, 220 of FIG. 8, and having like intermediate wire portions 661, 671. The clamp 600 includes upper and lower levers 601, 602 having associated flanges 604, 603. Also, appropriate flange connections 605, 606 are provided on the inner surface 607 of upper lever 601, engageable with the intermediate wire portions 661, 671, respectively, for securely engaging wires 660, 670 within the clamp 600. The wires 660, 670 have bent free ends 662, 663, and 672, 673, respectively, pointing outwardly for coupling to the associated holes on flange 603.

While particular embodiments and several specific forms of tools of the present invention have been shown and described, it will be appreciated by those skilled in the art that additional changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A flexural pivot joint joining two members for pivotal movement about a pivot axis, said pivot joint comprising two pairs of resilient spring wire sections spaced apart along the pivot axis, each wire section being coupled to both of the members and having a longitudinal axis, the wire sections of each pair being disposed in cross-arrangement with respect to each other and being deflectable from their respective longitudinal axes to accommodate pivoting of the members from an at-rest condition about the pivot axis.

2. The pivot joint of claim 1, wherein said wire sections are discrete from one another.

3. The pivot joint of claim 2, wherein the wire sections of each pair are crossed at a crossing point so that in the at-rest condition the crossing points of the two pairs define a line parallel to the pivot axis.

4. The pivot joint of claim 3, wherein each wire section has ends bent out of the associated longitudinal axis of the wire section to facilitate retention of said wire sections by said members.

5. The pivot joint of claim 4, wherein each of said members includes a plurality of hole arrangements, with each wire section bent end and being accommodated within a hole in an associated one of said hole arrangements, at least one of said hole arrangements on each member including multiple holes to accommodate wire sections of different length.

6. The pivot joint of claim 1, wherein the members are the pivoting arms of a battery jumper cable clamp.

7. The pivot joint of claim 1, wherein the wire sections of each pair are joined by and unitary with an intermediate wire portion.

8. The pivot joint of claim 7, wherein said intermediate wire portion is securely coupled to one of said members.

9. The pivot joint of claim 8, wherein said one member includes at least one flange disposed for engagement with said intermediate wire portion.

10. The pivot joint of claim 8, wherein each wire section has first and second ends, the first ends of each pair of wire sections being joined by the associated one of said intermediate wire portions and the second ends being bent out of the longitudinal axes of the respective wire sections to facilitate retention in the member opposite said one member.

11. The pivot joint of claim 7, wherein said two pairs of wire sections are joined by and unitary with a central wire portion.

12. The pivot joint of claim 11, wherein each wire section has first and second ends, the first ends of each pair of wire sections being joined by the associated one of the intermediate wire portions and the second ends of each pair of wire sections consisting of a free end and an end connected to the central wire portion.

13. The pivot joint of claim 12, wherein the free end of each pair of wire sections is bent out of its associated longitudinal axis to facilitate coupling to the member opposite the member to which is coupled said intermediate wire portion.

14. A flexural pivot joint for pivotally joining two members, said pivot joint comprising:

first and second brackets respectively coupled to the members, said brackets disposed facing each other and including a plurality of slots; and at least one pair of resilient spring wire sections, each wire section being coupled to both brackets and having a longitudinal axis, the wire sections being crossed and deflectable from their respective longitudinal axes to facilitate pivoting of the members from an at-rest condition about a pivot axis.

15. The pivot joint of claim 14, wherein each wire section has ends matingly engaged within associated ones of said slots in said brackets.

16. The pivot joint of claim 15, wherein at least some of said ends are bent out of the longitudinal axis of the respective wire section and said slots are sized and shaped to mate with said bent ends.

17. The pivot joint of claim 15, wherein said ends are press-fit in said associated slots.

18. The pivot joint of claim 15, wherein said ends are swaged in said associated slots.

19. The pivot joint of claim 14, wherein said brackets are made of aluminum and welded to said members.

20. The pivot joint of claim 14, wherein said members are the pivoting arms of a battery jumper cable clamp.

21. The pivot joint of claim 14, wherein the pivot joint includes two pairs of wire sections spaced apart along the pivot axis.

22. The pivot joint of claim 21, wherein the wire sections of each pair are joined by and unitary with an intermediate wire portion.

23. The pivot joint of claim 22, wherein each intermediate wire portion joins adjacent ends of its associated pair of wire sections.

24. The pivot joint of claim 23, wherein one of said brackets is slotted to matingly receive each intermediate wire portion.

25. The pivot joint of claim 24, wherein the ends of each pair of wire sections opposite the ends connected by the intermediate wire portion are free ends matingly engaged within associated ones of said slots in the bracket opposite the bracket receiving said intermediate wire portion.

26. The pivot joint of claim 25, wherein at least some of said free ends are bent out of the associated longitudinal axis of the respective wire section and said slots receiving said free ends are sized and shaped to mate with said bent free ends.

27. The pivot joint of claim 24, wherein the two pairs of wire sections are joined by and unitary with a central wire portion.

28. The pivot joint of claim 27, wherein the ends of each pair of wire sections opposite the ends connected by said intermediate wire portion consist of a free end and an end connected to the central wire portion.

29. The pivot joint of claim 28, wherein said bracket opposite the bracket receiving the intermediate wire portions is slotted to matingly receive said central wire portion.

30. The pivot joint of claim 29, wherein the free end of each pair of wire sections is bent out of its associated longitudinal axis and said slots receiving said free ends are sized and shaped to mate with said bent free ends.

* * * * *